(12) United States Patent
Miyajima et al.

(10) Patent No.: US 9,211,638 B2
(45) Date of Patent: Dec. 15, 2015

(54) RESILIENT RING-SHAPED CLIP INSTALLATION METHOD AND APPARATUS

(75) Inventors: Toshiyuki Miyajima, Sidney, OH (US); David Upshall, Georgetown (CA); Hideki Sadaoka, Barrie (CA)

(73) Assignee: HONDA MOTOR CO., LTD., Tokyo (JP)

( * ) Notice: Subject to any disclaimer, the term of this patent is extended or adjusted under 35 U.S.C. 154(b) by 505 days.

(21) Appl. No.: 13/434,439

(22) Filed: Mar. 29, 2012

(65) Prior Publication Data
US 2012/0324687 A1  Dec. 27, 2012

(30) Foreign Application Priority Data

Mar. 29, 2011 (CA) ..................................... 2735630

(51) Int. Cl.
*B25B 27/20* (2006.01)

(52) U.S. Cl.
CPC ........... *B25B 27/20* (2013.01); *Y10T 29/53657* (2015.01)

(58) Field of Classification Search
CPC .. B23P 19/084; B25B 27/20; Y10T 29/53657
USPC .............. 29/235, 269, 888.042, 888.049, 222
See application file for complete search history.

(56) References Cited

U.S. PATENT DOCUMENTS

| | | | |
|---|---|---|---|
| 1,740,590 A | 12/1929 | Hartman | |
| 3,134,168 A * | 5/1964 | Hans | 221/251 |
| 3,138,854 A | 6/1964 | Erdmann | |
| 3,605,239 A | 9/1971 | Eschholz | |
| 4,325,172 A * | 4/1982 | Holdaway | 29/235 |
| 4,610,834 A | 9/1986 | Baron et al. | |
| 5,315,746 A | 5/1994 | Machino et al. | |
| 5,343,607 A | 9/1994 | Southerland, Jr. et al. | |
| 5,956,830 A * | 9/1999 | Imbus et al. | 29/235 |
| 6,112,411 A * | 9/2000 | Rutter | 29/898.07 |
| 6,173,605 B1 * | 1/2001 | Rankin | 73/114.81 |
| 6,494,516 B1 * | 12/2002 | Bertini | 294/207 |
| 6,507,985 B1 | 1/2003 | Loughlin et al. | |
| 6,722,011 B1 * | 4/2004 | Bacon | 29/451 |
| 6,757,950 B2 | 7/2004 | Malone | |

(Continued)

FOREIGN PATENT DOCUMENTS

| | | | |
|---|---|---|---|
| FR | 2595283 A1 | 9/1987 | |
| FR | 2649349 A1 | 1/1991 | |

(Continued)

*Primary Examiner* — Lee D Wilson
*Assistant Examiner* — Henry Hong
(74) *Attorney, Agent, or Firm* — Standley Law Group LLP

(57) ABSTRACT

Disclosed herein is an installation method and apparatus for installing a resilient ring-shaped clip into engagement with a recess of a recipient channel. The apparatus generally comprises a clip delivery structure having a delivery channel formed therein and comprising an input for receiving the clip, a converging portion for radially biasing the clip, and an output for delivering the radially biased clip to the recipient channel. A clip stabilization mechanism may also be present for stabilizing the clip in the delivery channel, and for disengaging the clip upon application of an axial force to the clip that results in its passage through the delivery channel. Also disclosed is a clip delivery mechanism for displacing a clip through such a delivery channel and the recipient channel until engagement of the clip with the recess, wherein the clip stabilization mechanism disengages upon axial displacement of the clip by the clip delivery mechanism.

24 Claims, 18 Drawing Sheets

(56) References Cited

U.S. PATENT DOCUMENTS

| | | |
|---|---|---|
| 6,789,313 B2 | 9/2004 | Hendricks |
| 7,210,219 B2 | 5/2007 | Thal |
| 7,827,888 B2 | 11/2010 | Tatsumi |
| 8,267,593 B2 | 9/2012 | Suma |
| 8,505,176 B2 * | 8/2013 | Ueda et al. ............... 29/229 |
| 8,671,533 B2 | 3/2014 | Haag et al. |
| 8,776,347 B2 * | 7/2014 | Virkler et al. ............. 29/450 |
| 2004/0093728 A1 * | 5/2004 | Hendricks ............. 29/888.042 |
| 2005/0125982 A1 * | 6/2005 | Wambold et al. ........... 29/451 |
| 2007/0124920 A1 * | 6/2007 | Kim ....................... 29/709 |
| 2007/0231115 A1 * | 10/2007 | Tatsumi .................. 414/796.6 |
| 2008/0295331 A1 * | 12/2008 | Stemer ................. 29/888.044 |
| 2010/0192345 A1 | 8/2010 | Monyak et al. |
| 2011/0069922 A1 | 3/2011 | Ravenna et al. |

FOREIGN PATENT DOCUMENTS

| | | |
|---|---|---|
| FR | 2862247 A1 | 5/2005 |
| JP | 2004255501 | 9/2004 |
| JP | 2009083035 | 4/2009 |

\* cited by examiner

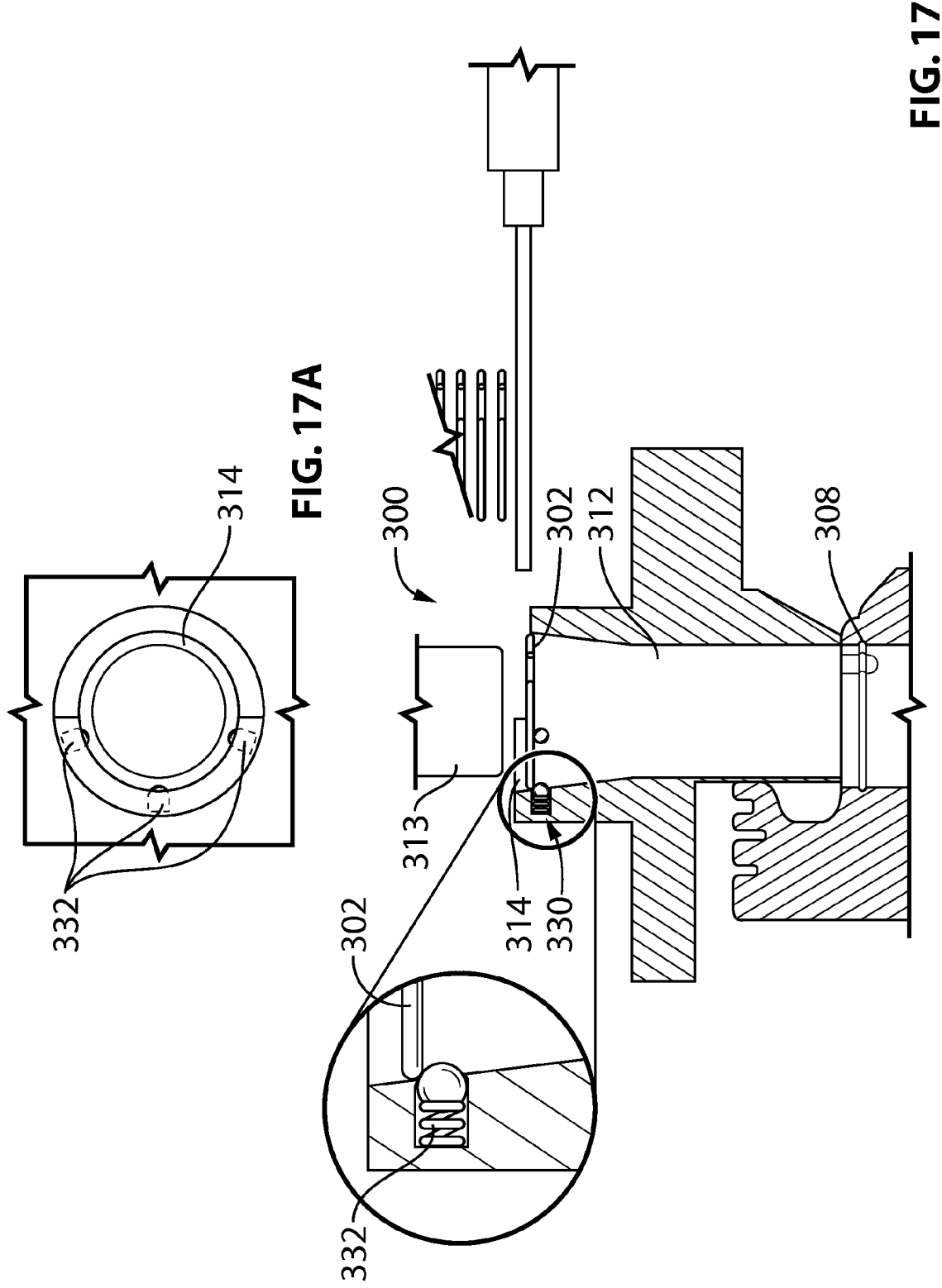

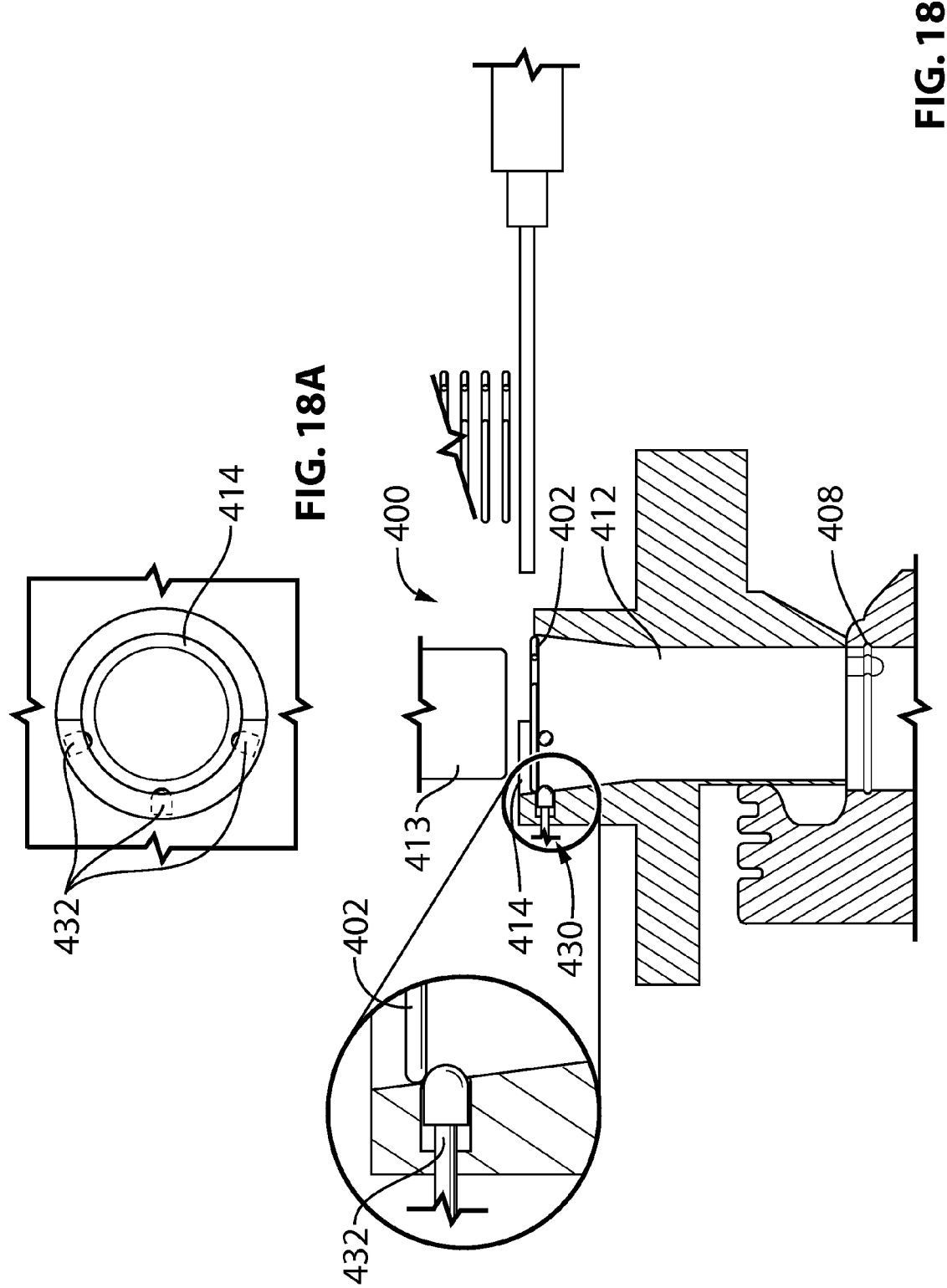

RESILIENT RING-SHAPED CLIP INSTALLATION METHOD AND APPARATUS

FIELD OF THE DISCLOSURE

The present disclosure relates to clips, and installation methods and apparatus therefor, and in particular, to a resilient ring-shaped clip installation method and apparatus.

BACKGROUND

C-clips (also known as circlips or snap rings) are generally known in the art to consist of an open-ring or c-shaped clip used, for example, to engage an annular groove circumferentially formed within a bore or on the surface of a shaft, or the like. Such installation generally serves to restrict axial movement of parts abutting the clip without impeding rotation, for example.

Various tools have been developed to facilitate installation of c-clips on a shaft, such as described in U.S. Patent Application Publication No. 2010/01923445 to Monyak et al., and U.S. Pat. No. 7,210,219 to Thai.

Installation of such clips for engagement with a corresponding recess or groove formed within and circumscribing a bore, however, can prove more difficult. Some tools and techniques have nonetheless been proposed to facilitate such installations, whereby the clip is generally introduced within the bore by various means, compressed, and ultimately released for engagement with the recess. Some examples are provided in U.S. Pat. No. 7,827,888 to Tatsumi, U.S. Pat. No. 6,789,313 to Hendricks, U.S. Pat. No. 6,507,985 to Loughlin et al., U.S. Pat. No. 3,134,168 to Erdmann, and U.S. Pat. No. 1,740,590 to Hardman.

As will be appreciated by the skilled artisan, the above and other such techniques suffer from various drawbacks. Therefore, there remains a need for a resilient ring-shaped clip installation method and apparatus that overcome some of the drawbacks of known technologies, or at least, provides the public with a useful alternative.

This background information is provided to reveal information believed by the applicant to be of possible relevance to the present invention. No admission is necessarily intended, nor should be construed, that any of the preceding information constitutes prior art against the present invention.

SUMMARY

An object of the invention is to provide a resilient ring-shaped clip installation method and apparatus that overcome some of the drawbacks of known technologies, or at least, provides the public with a useful alternative. In accordance with an embodiment of the invention, there is provided an apparatus for installing a resilient ring-shaped clip within a recipient channel by engagement with a corresponding recess formed therein, comprising: a clip delivery structure having a delivery channel formed therein for coaxial alignment with the recipient channel, said delivery channel comprising an input for receiving the clip in said delivery channel, a conically converging portion for radially biasing the clip upon axial displacement of the clip therethrough, and an output shaped and sized for delivery of the radially biased clip to the recipient channel; a clip delivery mechanism for axially displacing the clip through said delivery channel and recipient channel until engagement of the clip with the recess; and a clip stabilization mechanism for stabilizing the clip in said delivery channel in substantial coaxial alignment with said delivery channel, and disengaging the clip upon axial displacement of the clip by said clip delivery mechanism.

In accordance with another embodiment of the invention, there is provided an apparatus for delivering a resilient ring-shaped clip to a recipient channel for engagement with a corresponding recess formed therein, the apparatus comprising: a delivery structure having a delivery channel formed therein for coaxial alignment with the recipient channel and comprising an input for receiving the clip, a conically converging portion for radially biasing the clip upon axial displacement of the clip therethrough, and an output shaped and sized for delivery of the radially biased clip to the recipient channel; and a clip stabilization mechanism for stabilizing the clip in substantial coaxial alignment with the delivery channel, and disengaging the clip upon application of an axial force to the clip resulting in an axial displacement thereof through said delivery channel.

In accordance with another embodiment of the invention, there is provided a method for installing a resilient ring-shaped clip within a recipient channel by engagement with a corresponding recess formed therein, comprising: coaxially aligning a clip delivery channel with the recipient channel, said clip delivery channel conically converging to a shape and size corresponding with that of the recipient channel; positioning the clip in said delivery channel; releasably stabilizing the clip in substantial coaxial alignment with said delivery channel; and applying an axial force to the releasably stabilized clip to axially displace the clip through said conically converging delivery channel, thereby radially biasing the clip and delivering the radially biased clip through the recipient channel until engagement thereof with the recess.

Other aims, objects, advantages and features of the invention will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 10A is a top view of an input of the apparatus of FIG. 10;

FIG. 17 is a cross sectional view of an apparatus for installing a resilient ring-shaped clip within a recipient channel by engagement with a corresponding recess formed therein, in accordance with one embodiment of the invention, further showing a blowup of a clip stabilization mechanism thereof;

FIG. 17A is a top view of an input of the apparatus of FIG. 17;

FIG. 18 is a cross sectional view of an apparatus for installing a resilient ring-shaped clip within a recipient channel by engagement with a corresponding recess formed therein, in accordance with one embodiment of the invention, further showing a blowup of a clip stabilization mechanism thereof; and FIG. 18A is a top view of an input of the apparatus of FIG. 18.

DETAILED DESCRIPTION

Figure 1:
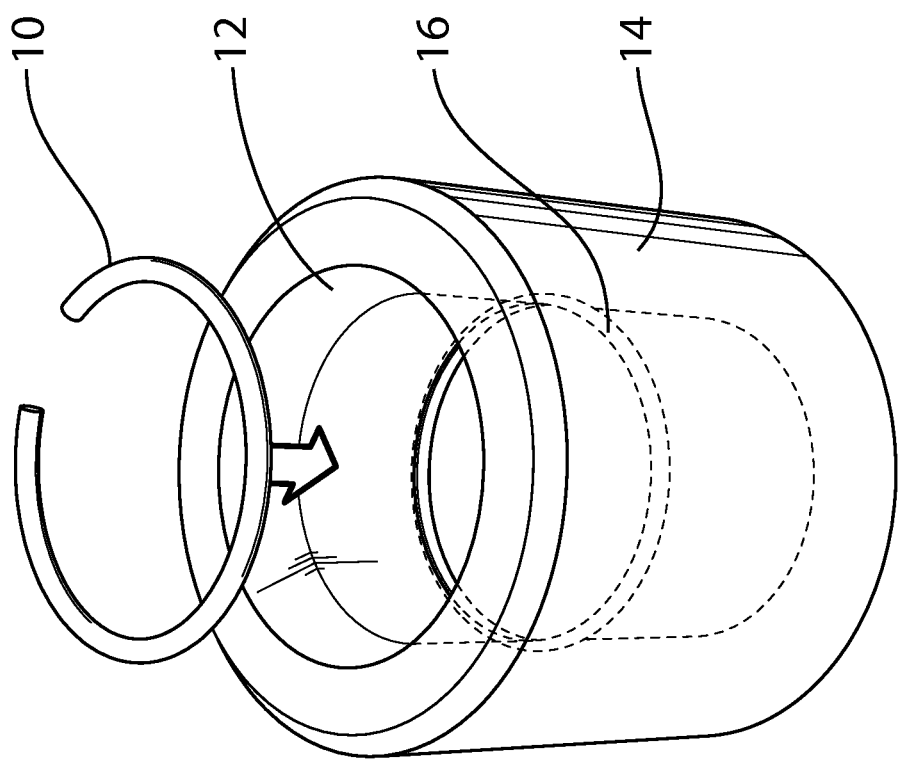
FIG. 1 is a perspective view of a resilient ring-shaped clip coaxially aligned with a recipient channel for installation therein by engagement with a corresponding recess formed therein, in accordance with one embodiment of the invention.

It should be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical or electrical connections or couplings. Furthermore, and as described in subsequent paragraphs, the specific mechanical or electrical configurations illustrated in the drawings are intended to exemplify embodiments of the disclosure. However, other alternative mechanical or electrical configurations are possible which are considered to be within the teachings of the instant disclosure. Furthermore, unless otherwise indicated, the term "or" is to be considered inclusive.

With reference to the disclosure herein and the appended figures, a resilient ring-shaped clip installation method and apparatus will now be described, in accordance with different embodiments of the invention.

With reference to FIG. 1, the apparatus and methods described herein provide for facilitated installation of a ring-shaped clip, such as C-clip 10, within a receiving channel 12 defined within a structure 14 by engagement with a corresponding recess 16 formed within the receiving channel 12. For instance, in the illustrated example of FIG. 1, the clip 10 consists of a C-clip (also known as a circlip or snap ring) which, upon being radially compressed (i.e. by reducing the circumferential spacing between the clip's free ends) and coaxially aligned with the receiving channel 12, can be inserted and axially displaced therein until engagement thereof with the recess 16, which in this example, consists of an annular recess or groove that circumscribes the receiving channel 12 and within which the clip 10 can be relaxed and thus engaged. The installation of the clip 10 thus provides an internal structure for limiting, for example, axial displacement of subsequent structures (not shown) to be installed within the receiving channel 12 without limiting rotation of such structures. It will be appreciated that while the following exemplary embodiments contemplate the installation of C-clips within corresponding grooves at least partially circumscribing a substantially cylindrical channel, as shown in FIG. 1 for example, other clip, recipient channel and corresponding groove shapes and sizes may be also be considered herein without departing from the general scope and nature of the present disclosure, as will be readily apparent to the person of ordinary skill in the art upon reference to the following disclosure.

Figure 2:
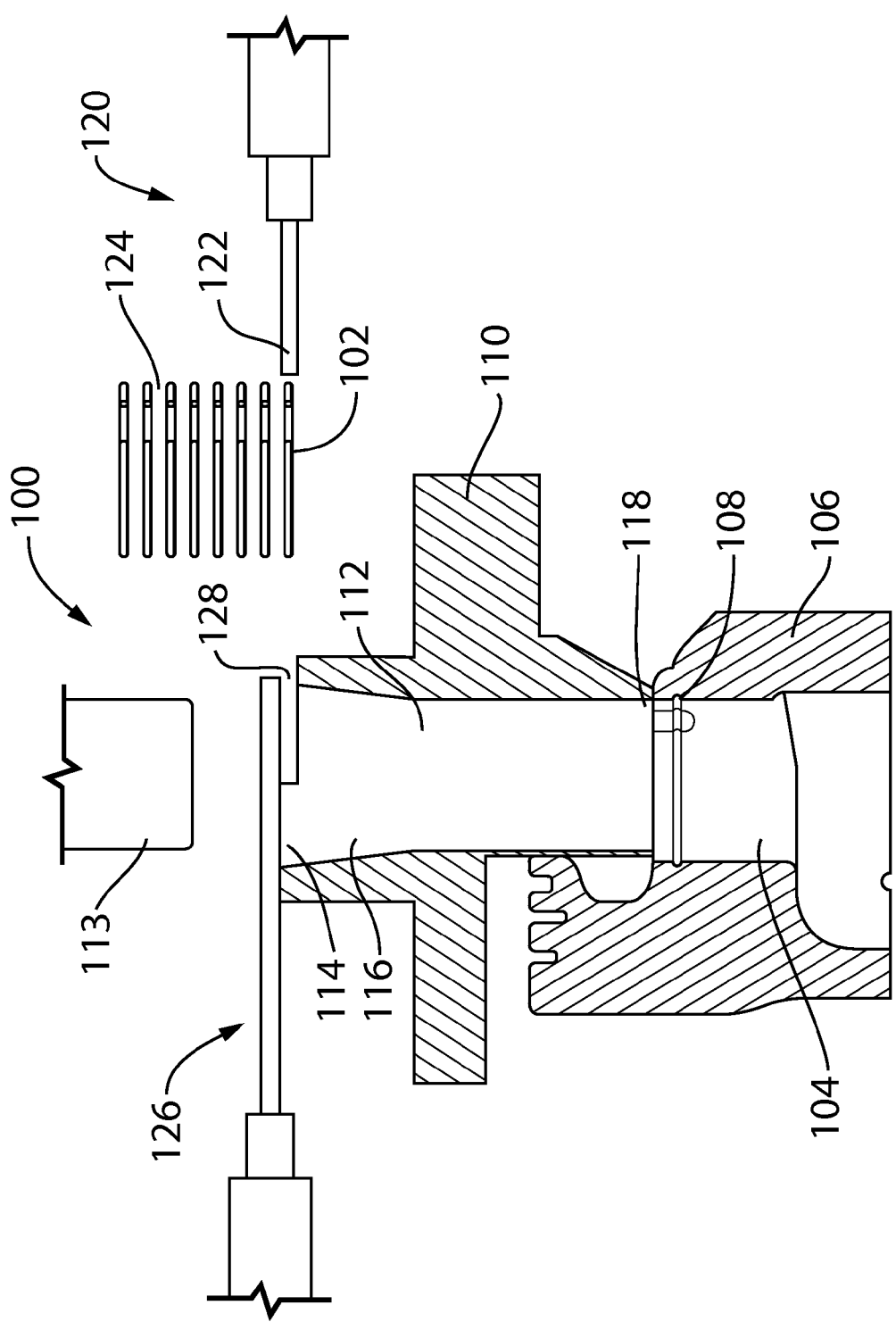
FIGS. 2 to 9 are cross sectional views of an apparatus for installing a resilient ring-shaped clip within a recipient channel by engagement with a corresponding recess formed therein, in accordance with one embodiment of the invention, successive figures showing successive steps in operation of the apparatus.
Figure 3:
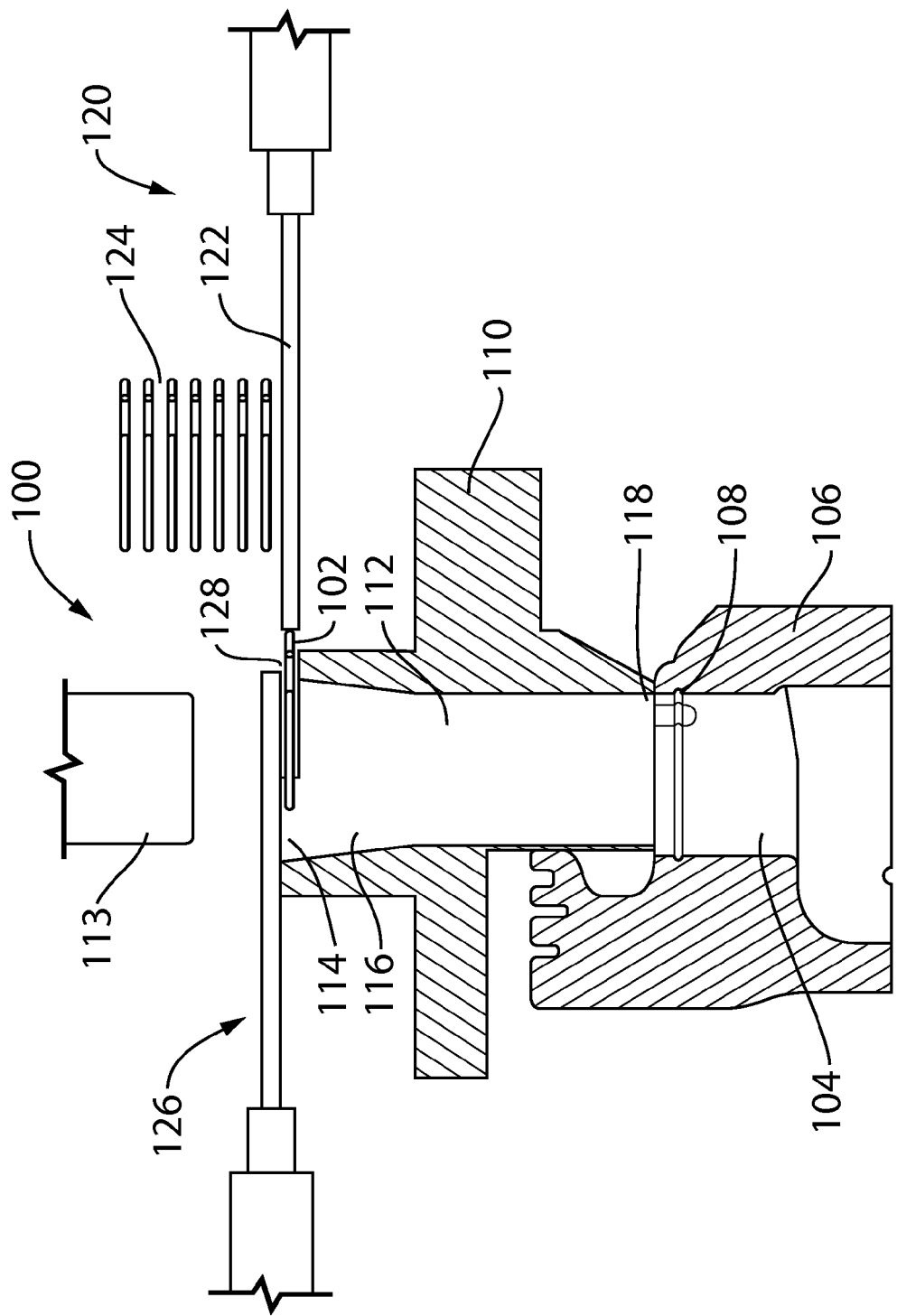
Figure 4:
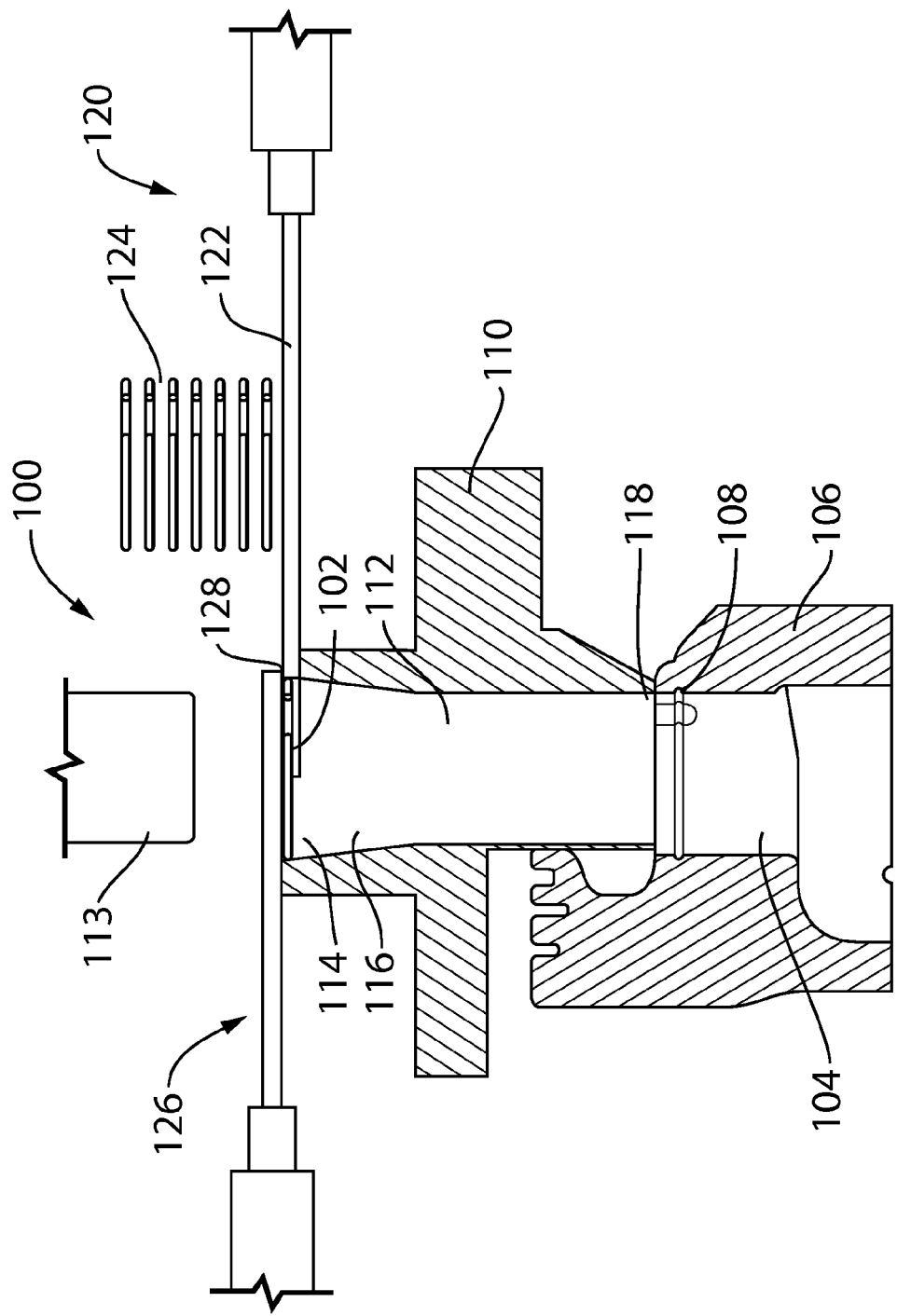

Referring now to FIG. 2, and in accordance with one embodiment of the invention, an example of an apparatus for installing resilient ring-shaped clips will now be described. In this embodiment, the apparatus, generally referred to using the numeral 100, provides for facilitated installation of a ring-shaped clip, such as C-clip 102, within a recipient channel 104 defined within a recipient structure 106, by engagement with a corresponding recess 108 formed within this channel 104. For example, in this embodiment, the recipient channel 104 consists of a piston pin bore having an annular recess formed therein and at least partially circumscribing same, within which the c-clip is to be engaged to restrict axial displacement of a subsequently installed structure therein without limiting the free rotation thereof within the recipient channel. It will be appreciated by the skilled artisan that this embodiment provides one example as to the application of the herein-described embodiments of the invention, and that such embodiments should not be limited to this example but rather, should be understood to encompass other applications as will be readily apparent to the person of ordinary skill in the art.

Still referring to FIG. 2, the apparatus 100 generally comprises a clip delivery structure 110 having a delivery channel 112 formed therein for coaxial alignment with the recipient channel 104. The delivery channel 112 generally defines an input 114 for receiving the clip 102 unbiased and coaxially aligned with the delivery channel 112, a conically converging portion 116 for radially biasing the clip 102 upon axial displacement of the clip 102 therethrough, and an output 118 shaped and sized for delivery of the radially biased clip 102 to the recipient channel 104. For example, in one embodiment, the delivery structure 110 may comprise a jig shaped and sized for cooperative alignment with the recipient structure 106 in coaxially aligning the delivery channel 112 with the recipient channel 104, thus facilitating clip installation.

A clip delivery mechanism 113 is also provided, consisting in this example of a piston, plunger or the like, which can be activated to engage the clip 102 at the input 114 and axially displace the clip 102 through the delivery channel 112 and recipient channel 104 until engagement of the clip 102 with the recess 108.

In this particular embodiment, the apparatus 100 further comprises an optional clip feeding mechanism 120 for feeding successive clips 102 to the input 114 for delivery to successive recipient channels in a manufacturing chain, for example. For instance, in this example, the clip feeding mechanism 120 comprises a retractable piston or plunger 122 that is activated to push successive clips 102 provided in its path from a stack thereof 124 toward the input 114. Other clip feeding mechanisms will be readily apparent to the person of ordinary skill in the art and should thus be considered to fall within the scope of the present disclosure.

In this particular embodiment, the apparatus 100 further also comprises an optional retractable input cover 126 that, upon deployment, defines an input slot 128 for guiding receipt of successive clips 102 provided via feeding mechanism 120, so that such clips 102 are received at the input 114 unbiased and coaxially aligned with the delivery channel 112. Clearly, in this particular embodiment and as will be described below, the retractable cover 126 is retracted prior to activation of the clip delivery mechanism 113.

Figure 5:
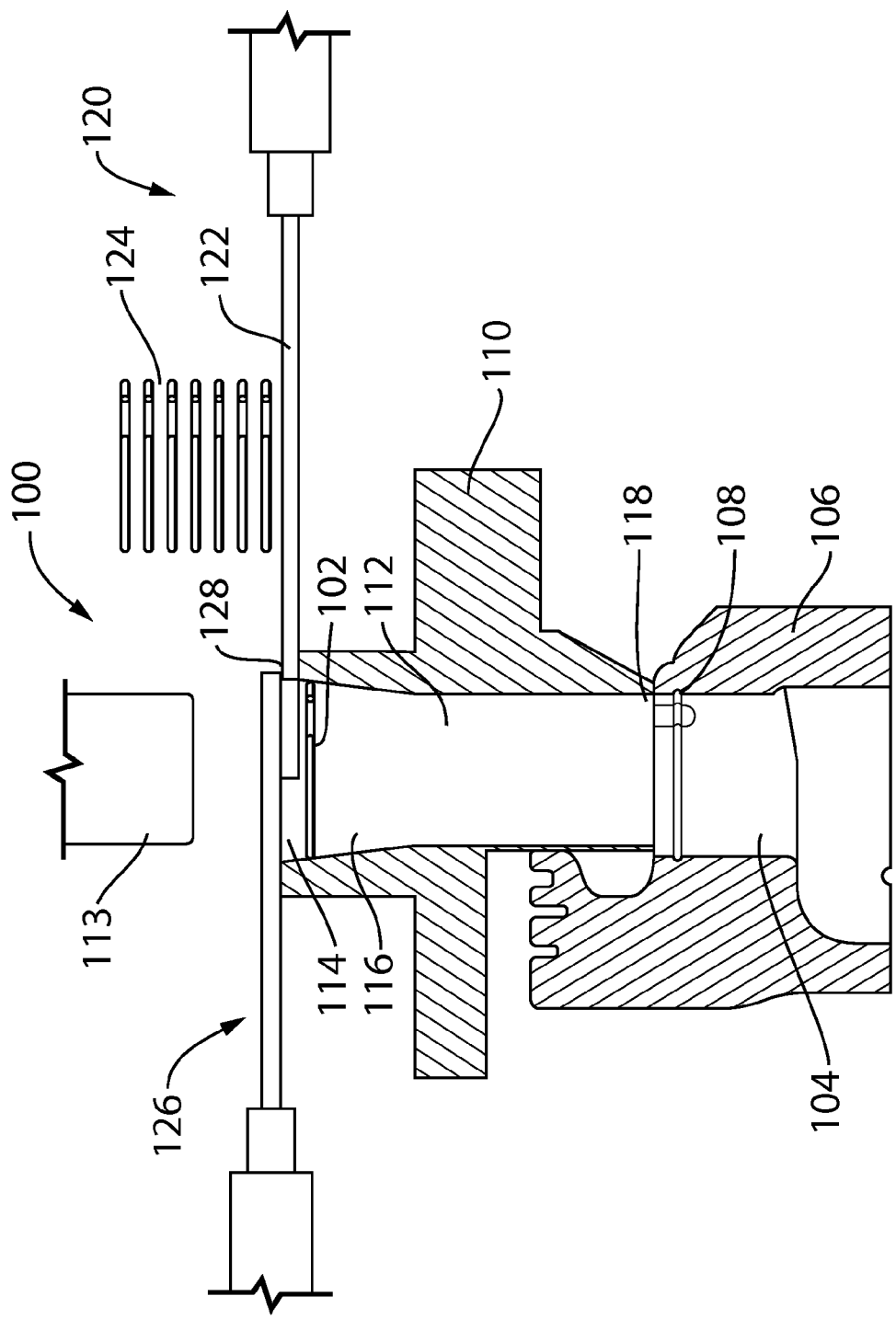

Referring now to FIGS. 2 to 9, operation of the above-described embodiment will now be described. In FIG. 2, the input cover 126 is deployed thereby defining input slot 128, and the clip feeding mechanism 120 is retracted and ready for deployment of clip 102 toward the slot 128. The clip 102 is then advanced through the slot 128 (FIG. 3), positioned unbiased and coaxially aligned with the delivery channel 112 at the input 114 (FIG. 4) where it is rested upon the conically converging portion 116 ready for installation (FIG. 5).

Figure 6:
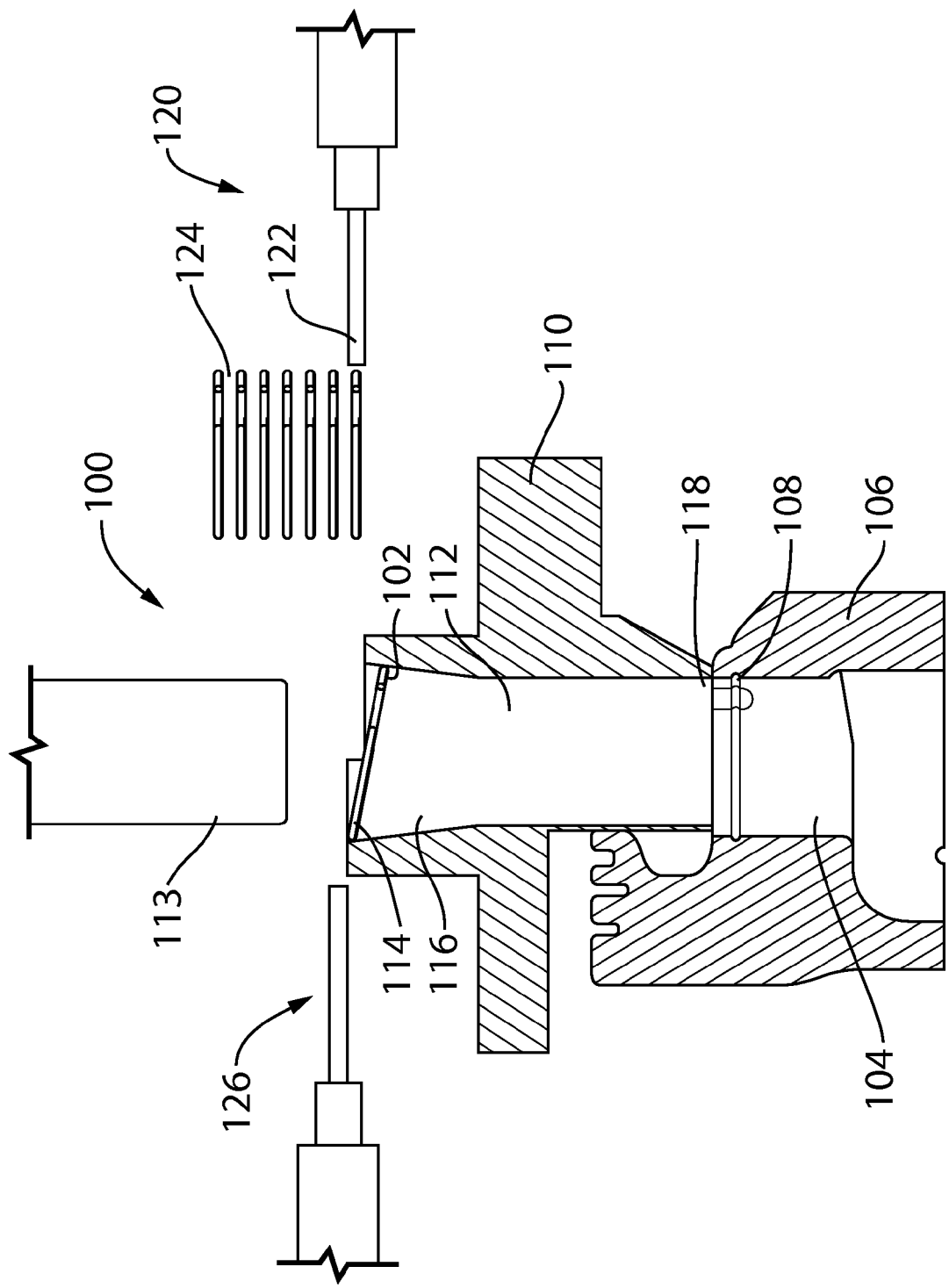
Figure 7:
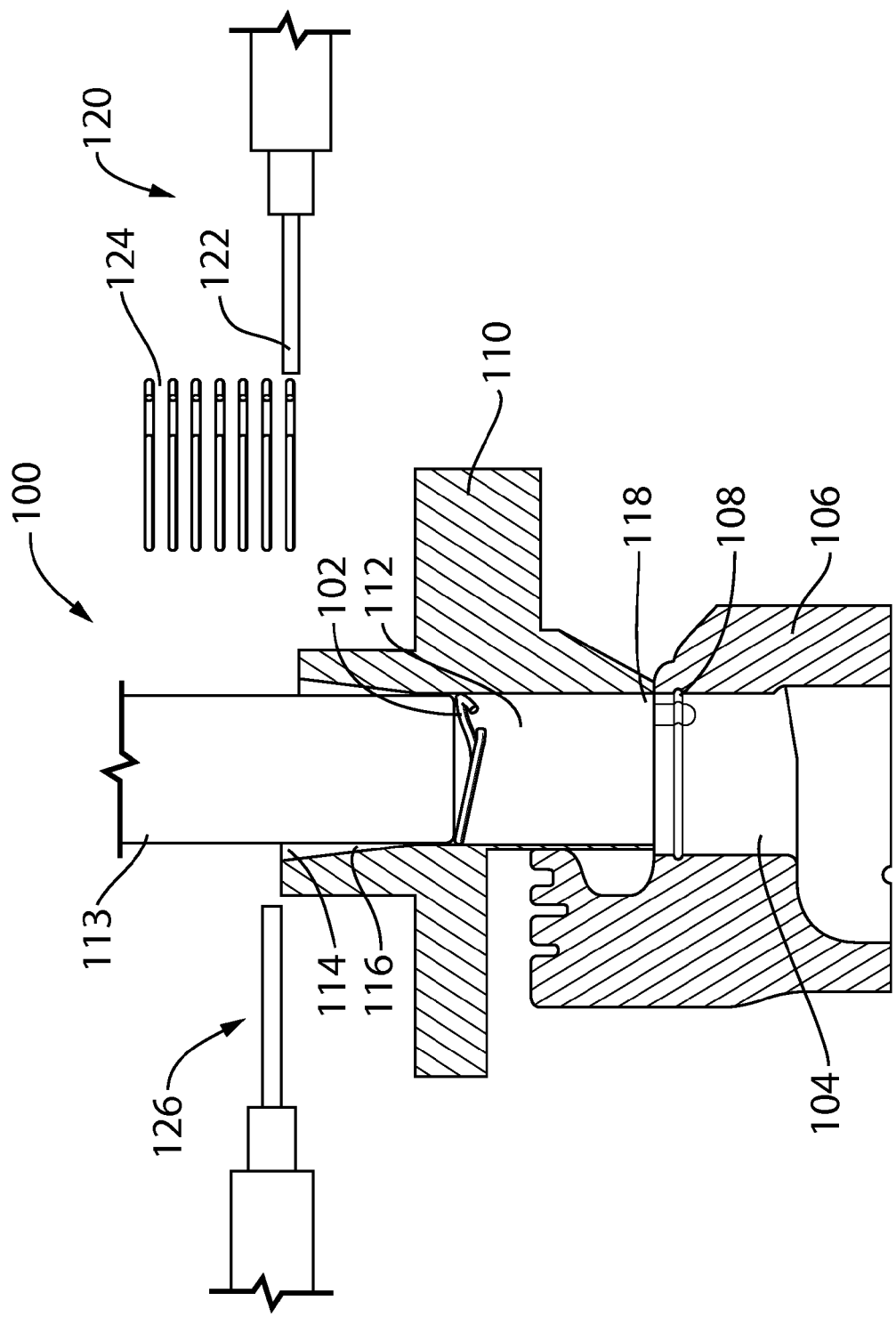
Figure 8:
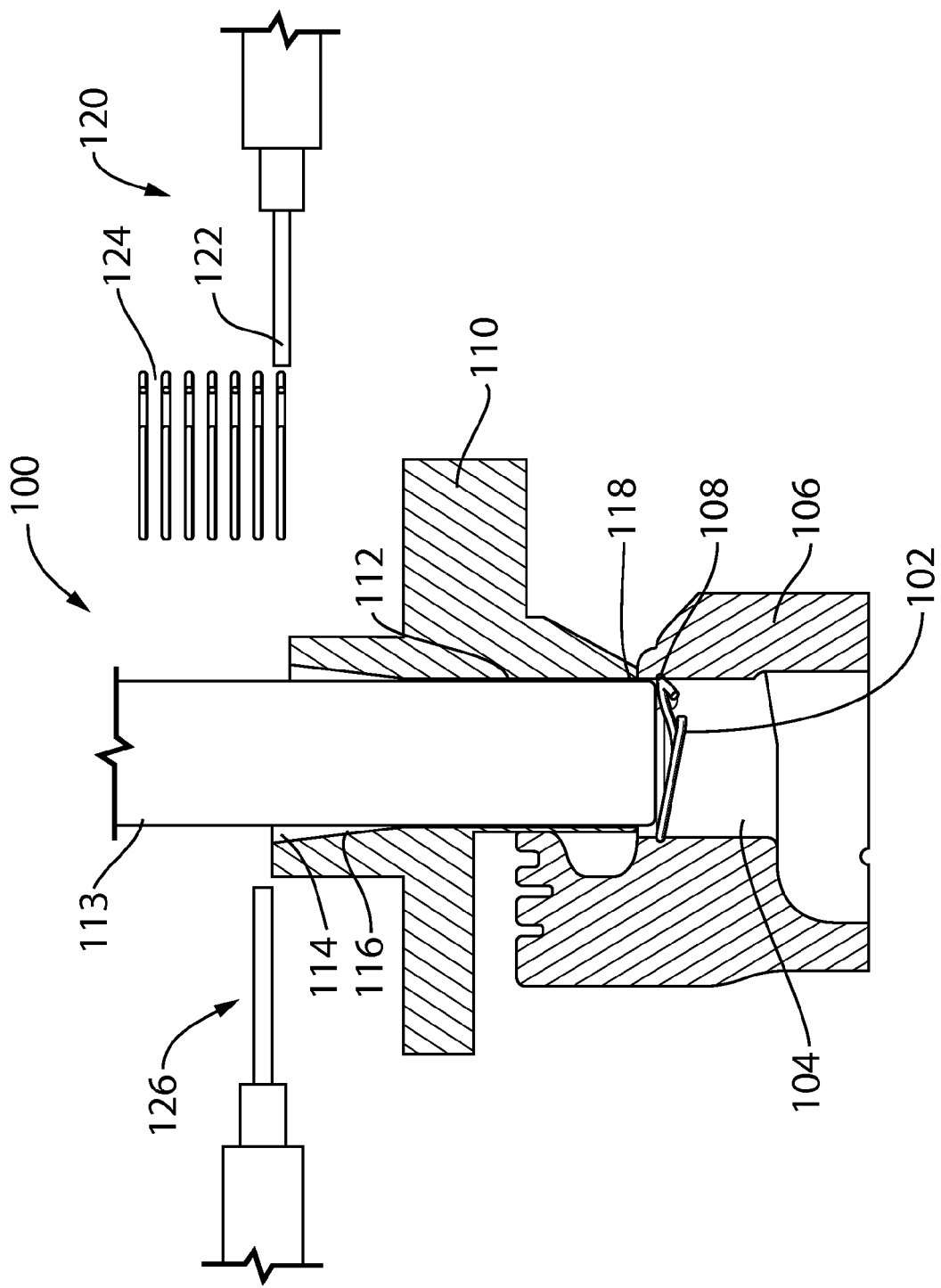
Figure 9:
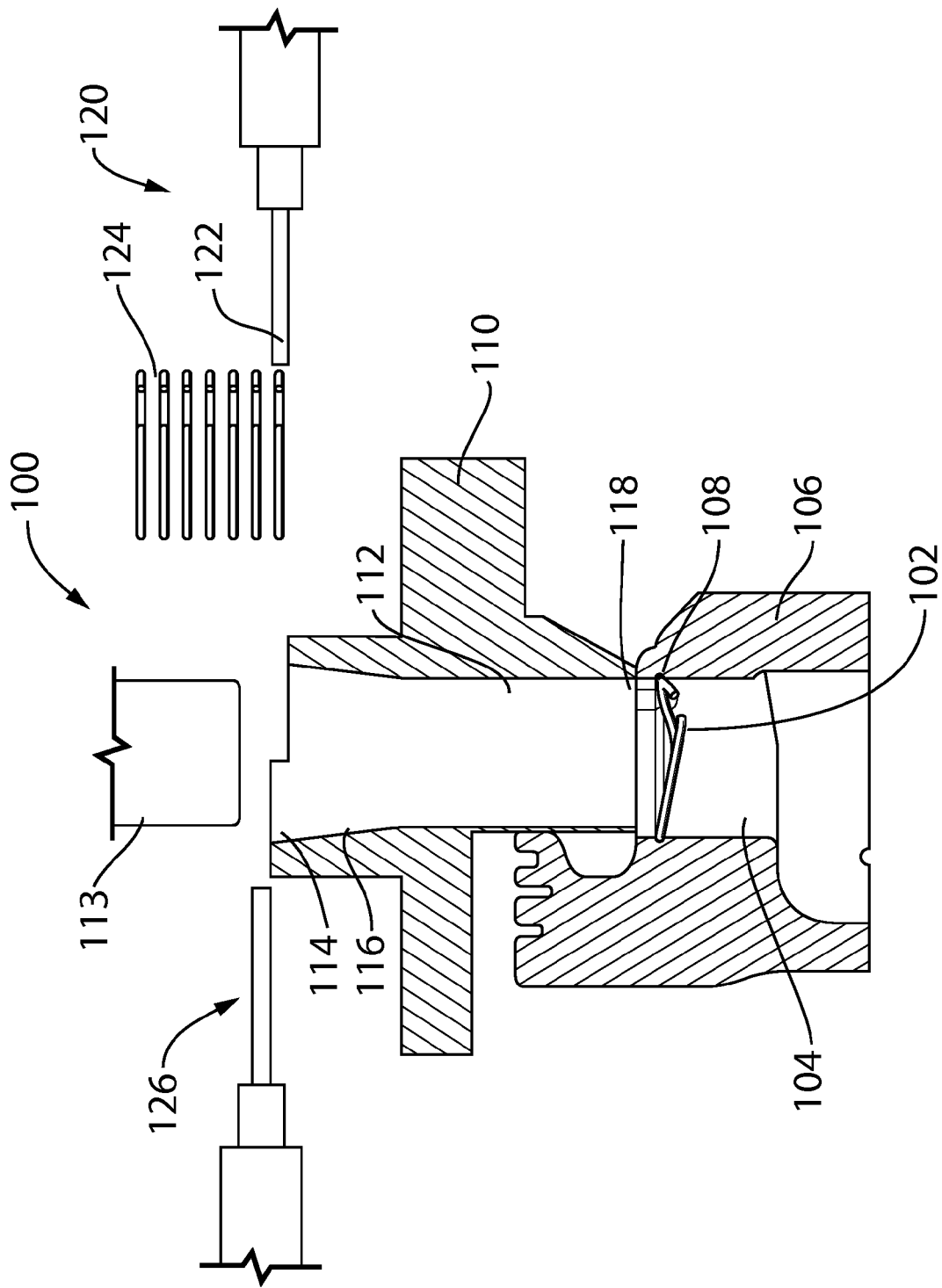

In desirable conditions, the clip 102 rests unbiased and coaxially aligned with the delivery channel 112, in part, at least in this embodiment, due to the provision of the retractable input cover 126, whereby, once the cover 126 is retracted, the clip delivery mechanism 113 may be deployed to axially displace the clip 102 through the delivery channel 112 and recipient channel 104 for engagement with recess 108. In embodiments devoid of an input cover 126, or even in the context of this embodiment where an input cover 126 is provided and deployed, it may be that the clip's 102 orientation is altered at the input 114, for example as depicted in FIG. 6. Namely, it has been observed that while the provision of a retractable input cover 126, as depicted herein, promotes proper clip 102 input alignment and orientation, the clip 102 is occasionally disturbed upon retraction of the cover 126, resulting in improper alignment and orientation of the clip 102. In such cases, and as shown in FIGS. 7 to 9, when the delivery mechanism 113 is deployed to engage and axially displace the disturbed clip 102, the clip 102 may be bent, warped and/or dislodged at the input 114, often leading to further clip 102 damage during axial displacement thereof through the delivery channel 112 (e.g. see FIGS. 7 and 8), and/or in a misaligned final installation of the clip 102 within the recess 108, as shown for example in FIG. 9.

Figure 10:
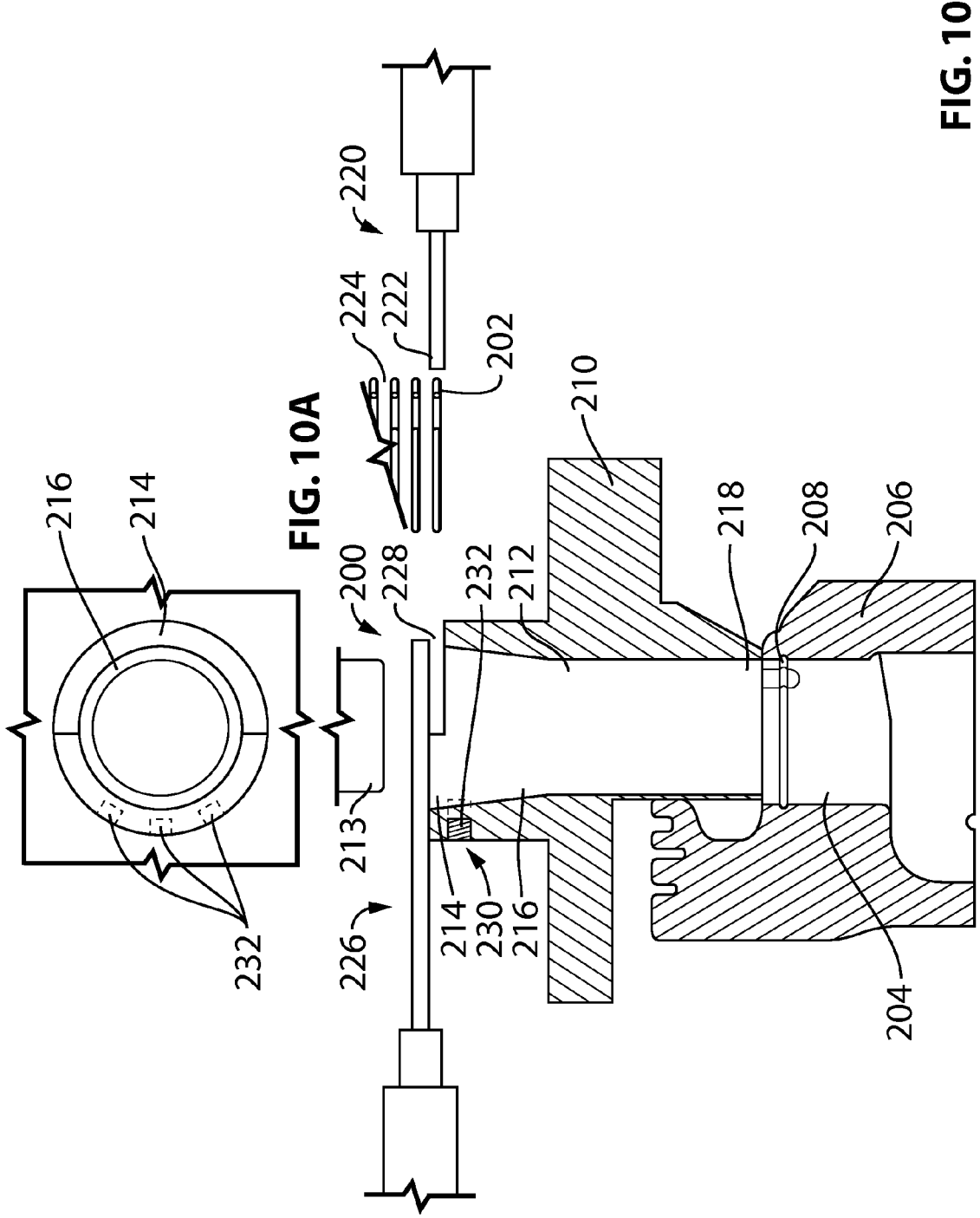
FIG. 10 is a cross sectional view of an apparatus for installing a resilient ring-shaped clip within a recipient channel by engagement with a corresponding recess formed therein, in accordance with one embodiment of the invention.
Figure 11:
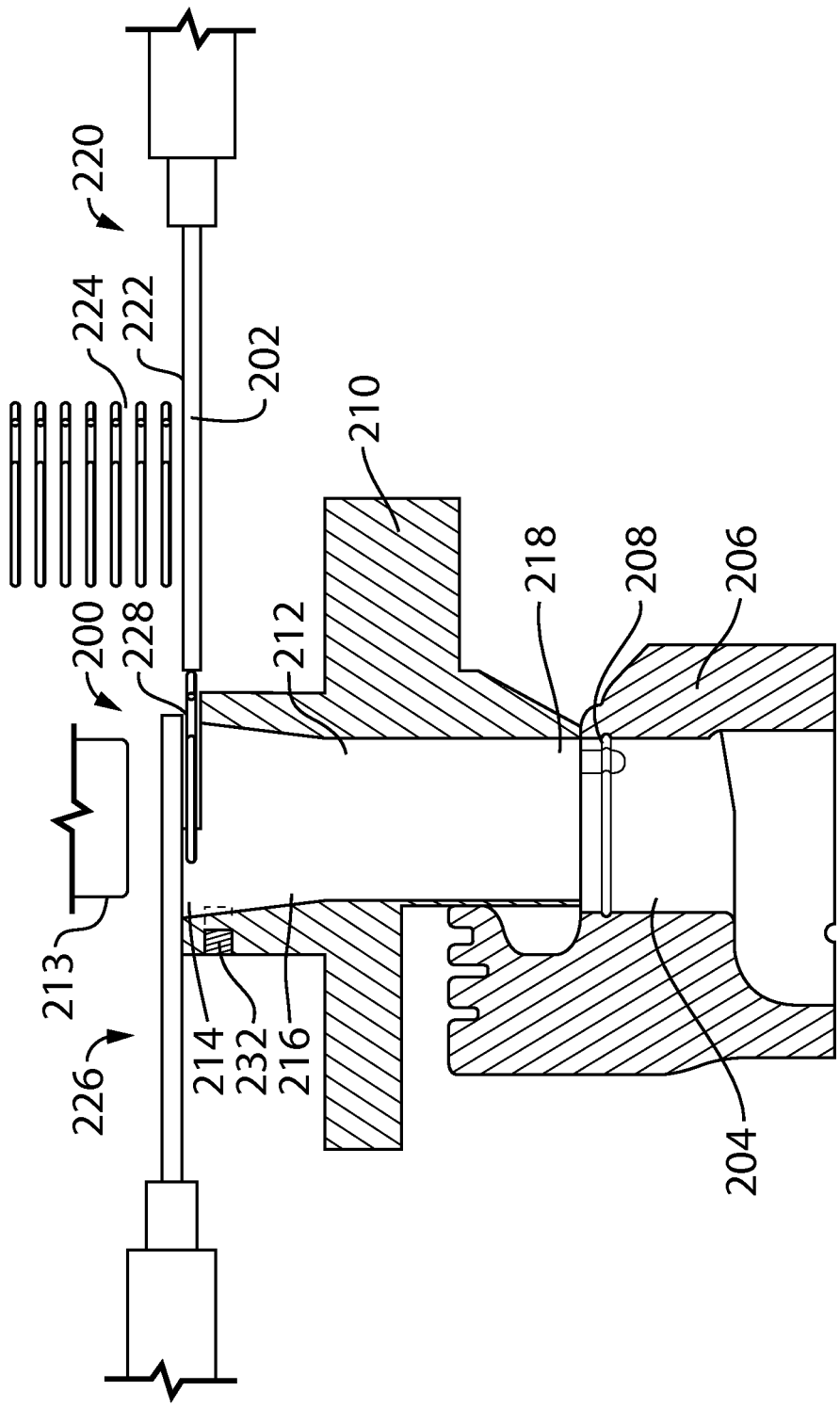
FIGS. 11 to 16 are cross sectional views of the apparatus of FIG. 10, showing successive steps in operation of the apparatus.

Referring now to FIG. 10, an alternative embodiment will be described that promotes proper alignment and orientation of the clip 102 at the input 114, thus mitigating at least some of the challenges presented by the above embodiment, and other such technologies. In this embodiment, an apparatus, generally referred to using the numeral 200, provides for facilitated installation of a ring-shaped clip, such as C-clip 202, within a recipient channel 204 defined within a recipient structure 206, by engagement with a corresponding recess 208 formed within this channel 204. For example, in this embodiment, the recipient channel 204 again consists of a piston pin bore having an annular recess formed therein and at least partially circumscribing same, within which the c-clip 202 is to be engaged.

The apparatus 200 generally comprises a clip delivery structure 210 having a delivery channel 212 formed therein for coaxial alignment with the recipient channel 204. The delivery channel generally defines an input 214 for receiving the clip 202 unbiased and coaxially aligned with the delivery channel 212, a conically converging portion 216 for radially biasing the clip 202 upon axial displacement of the clip 202 therethrough, and an output 218 shaped and sized for delivery of the radially biased clip 202 to the recipient channel 204. For example, in one embodiment, the structure 210 may comprise a jig shaped and sized for cooperative alignment with the recipient structure 206 in coaxially aligning the delivery channel 212 with the recipient channel 204, thus facilitating clip installation.

A clip delivery mechanism 213 is also provided, again consisting in this example of a piston, plunger or the like, which can be activated to engage the clip 202 at the input 214 and axially displace the clip 202 through the delivery channel 212 and recipient channel 204 until engagement of the clip 202 with the recess 208.

In this particular embodiment, the apparatus 200 further comprises an optional clip feeding mechanism 220 for feeding successive clips 202 to the input 214 for delivery to successive recipient channels in a manufacturing chain, for example. For instance, in this example, the clip feeding mechanism 220 again comprises a retractable piston or plunger 222 that is activated to push successive clips 202 provided in its path from a stack thereof 224 toward the input 214.

In this particular embodiment, the apparatus 200 again further also comprises an optional retractable input cover 226 that, upon deployment, defines an input slot 228 for guiding receipt of successive clips 202 provided via feeding mechanism 220, so that such clips 202 are received at the input 214 unbiased and coaxially aligned with the delivery channel 212. Clearly, in this particular embodiment and as will be described below, the retractable cover 226 is retracted prior to activation of the clip delivery mechanism 213.

In this embodiment, and with added reference to FIG. 10A, the apparatus 200 further comprises a clip stabilization mechanism 230 circumferentially disposed about the delivery channel 212 for releasably stabilizing coaxial alignment of the unbiased clip 202 at the input 214, which automatically disengages upon axial displacement of the clip 202 by the clip delivery mechanism 213. For example, in this embodiment, the clip stabilization mechanism 230 comprises one or more magnets 232 (e.g. three in this embodiment) circumferentially disposed about the input 214 to the delivery channel 212, such that upon delivering a clip 202 thereto, the magnets 232 provide a substantially radial magnetic force that retains the clip 202 in its intended position and orientation while the input cover 226 is retracted and until the delivery mechanism 213 is deployed. Upon the delivery mechanism 213 engaging the clip 202 and applying an axial force thereto, the clip 202 and magnets 232 are automatically disengaged, thereby allowing the clip 202 to be delivered by the delivery mechanism 213 through the delivery 212 and recipient 204 channels for engagement with the recess 208. In this particular embodiment, the clip stabilization mechanism 230 comprises three circumferentially spaced-apart magnets 232, however, it will be appreciated that different numbers of magnets 232 disposed and/or grouped in different configurations, may be considered herein without departing from the general scope and nature of the present disclosure.

Figure 12:
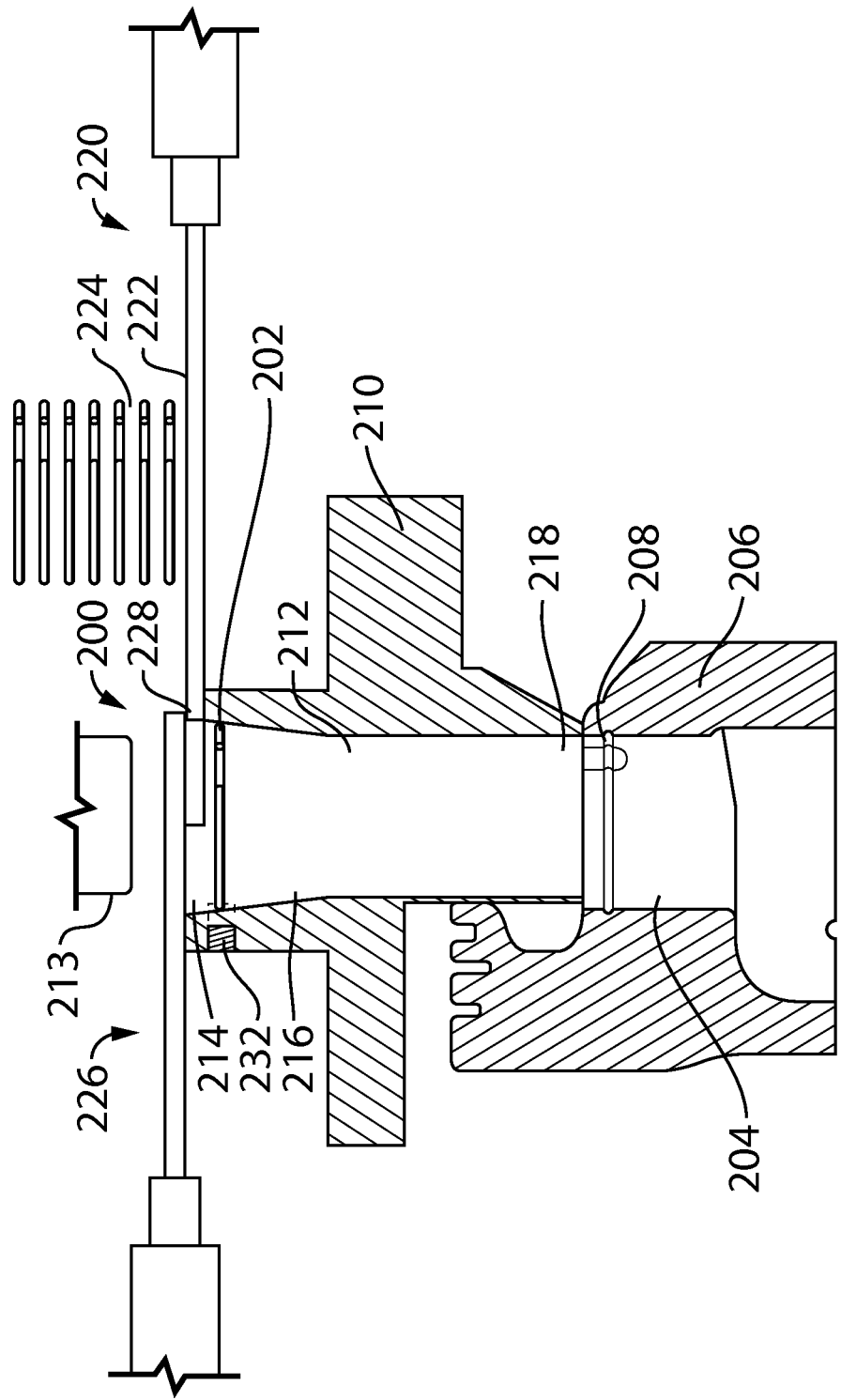

Referring now to FIGS. 10 to 16, operation of the above-described embodiment will now be described. In FIG. 10, the input cover 226 is deployed thereby defining input slot 228, and the clip feeding mechanism 220 is retracted and ready for deployment of clip 202 toward the slot 228. The clip 202 is then advanced through the slot 228 (FIG. 11), and positioned unbiased and coaxially aligned with the delivery channel 212 at the input 214, where it is further engaged by the magnets 232 of clip stabilization mechanism 230 as it rests upon the conically converging portion 216 ready for installation (FIG. 12).

Figure 13:
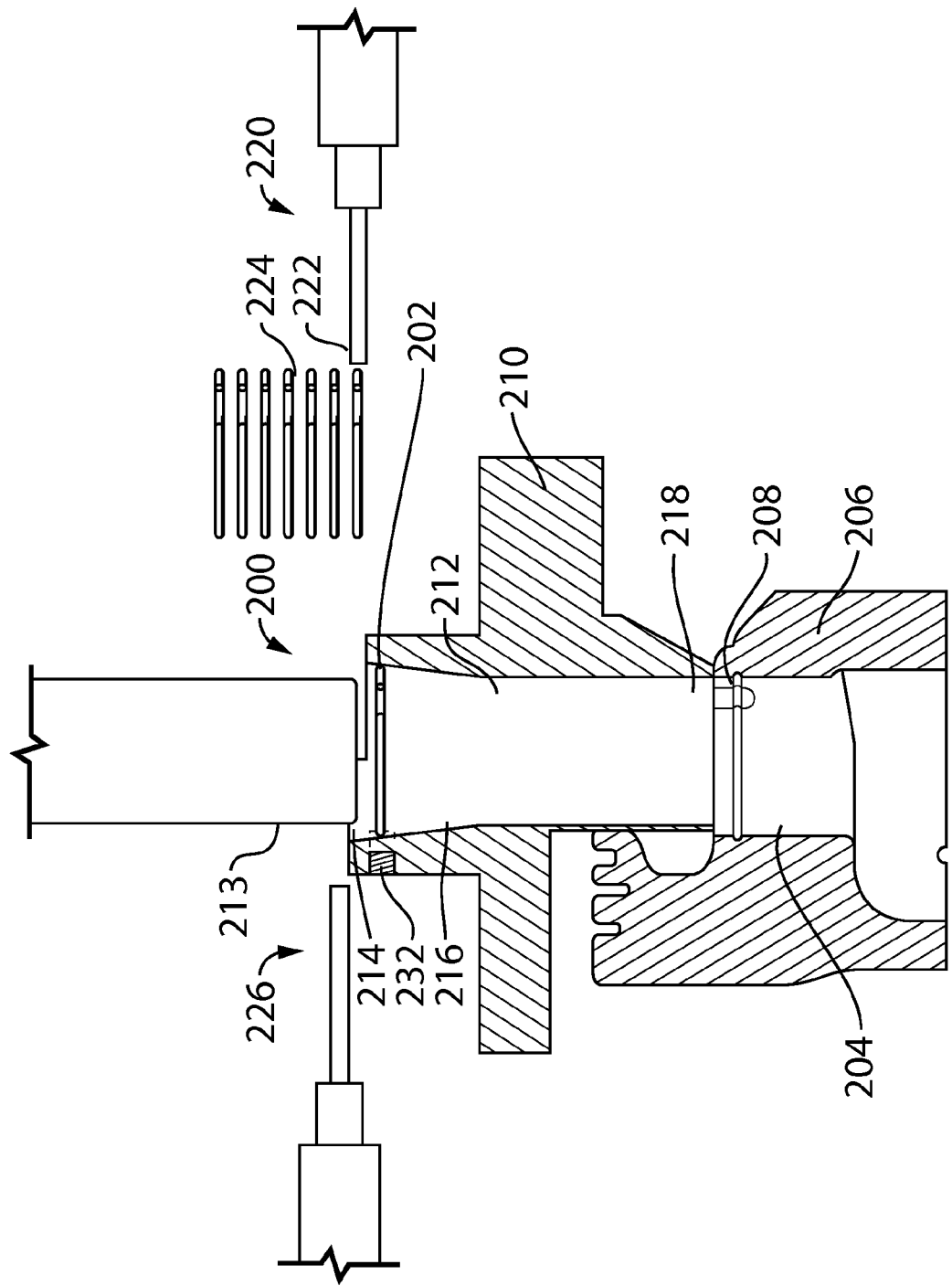
Figure 14:
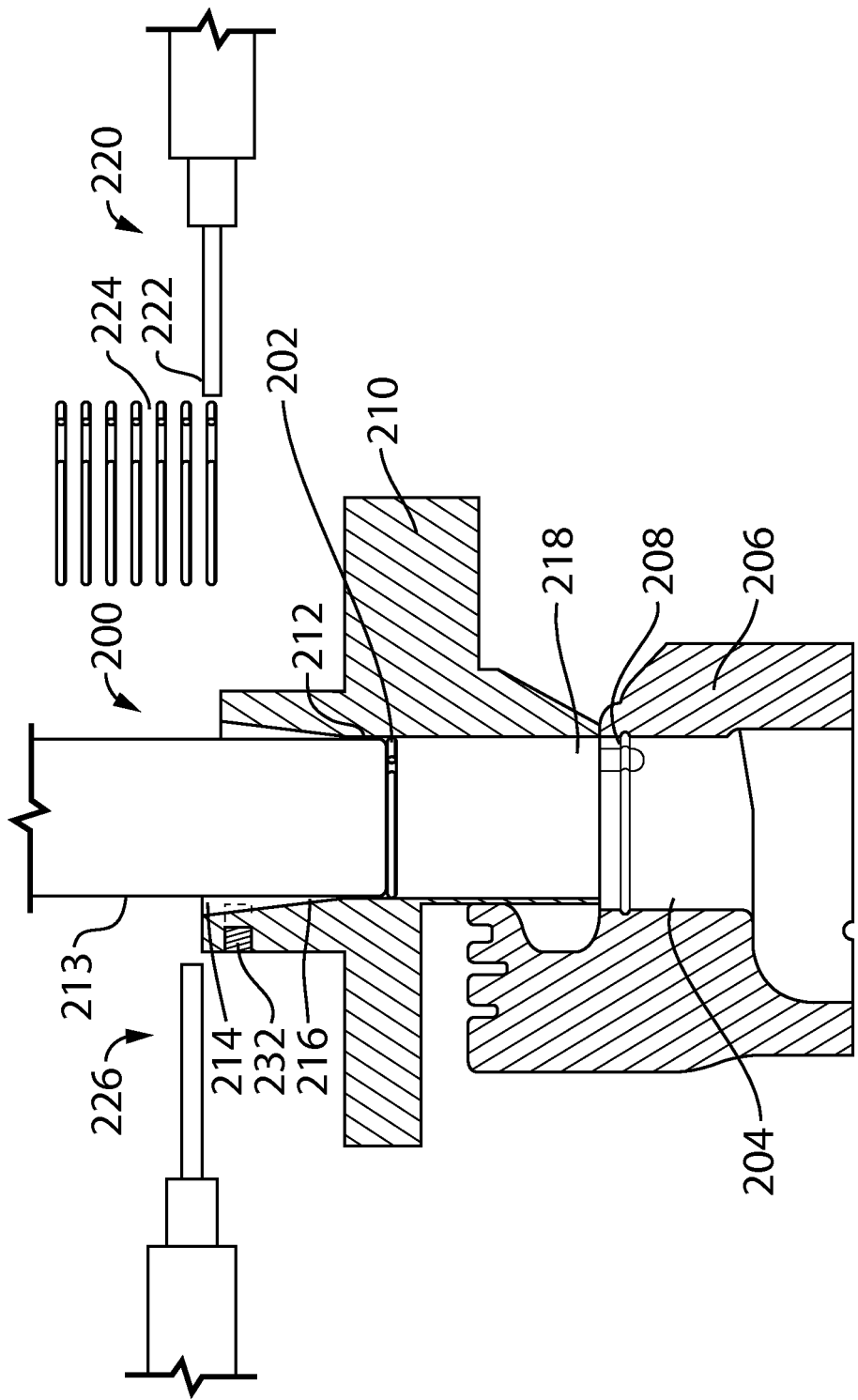
Figure 15:
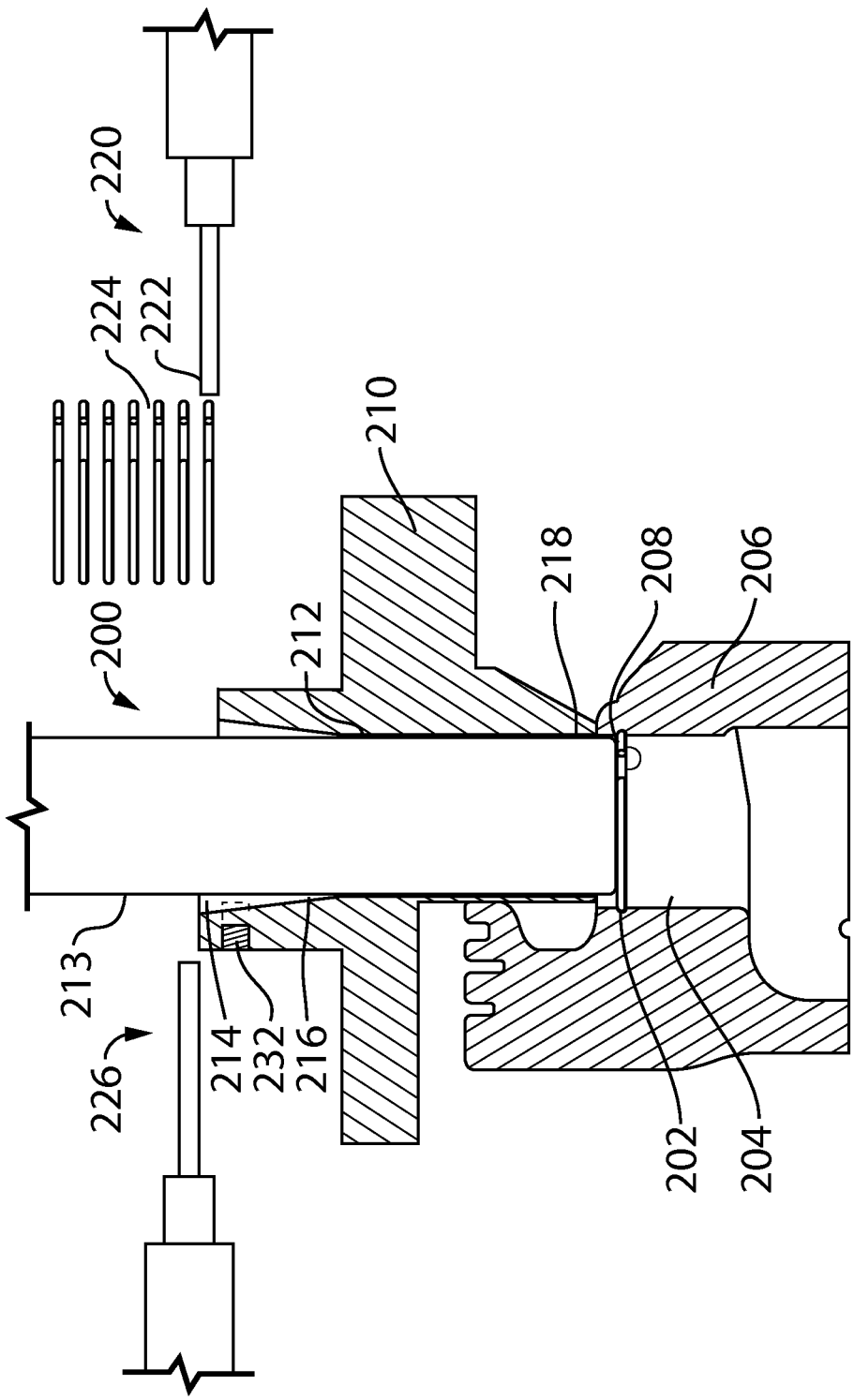
Figure 16:
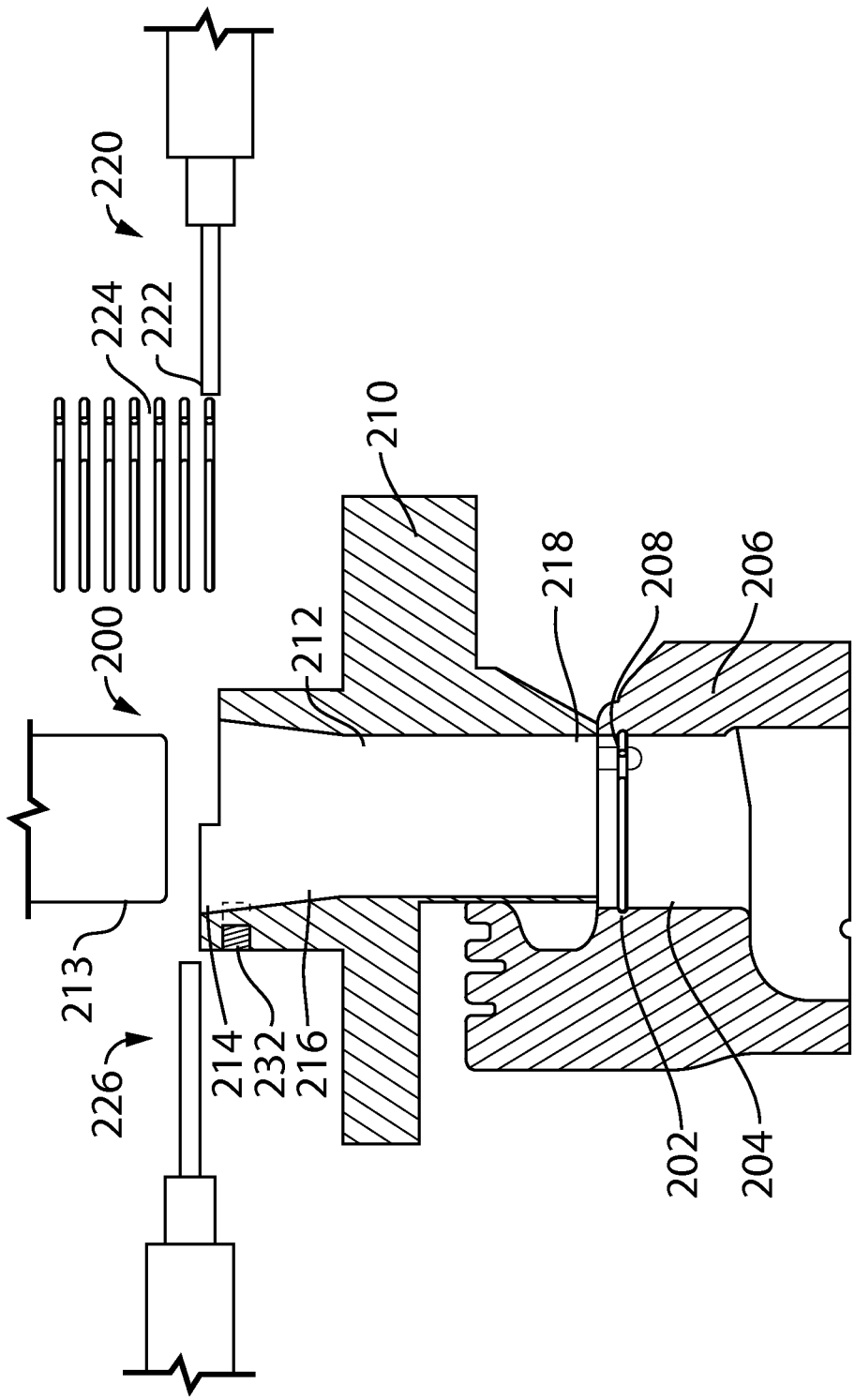

As shown in FIG. 13, the clip feeding mechanism 220 is retracted as is the input cover 226, allowing the clip delivery mechanism 213 to be deployed. Given the provision of clip stabilization mechanism 230, the clip 202 remains coaxially aligned and oriented with the clip delivery channel 212 until axial engagement thereof by the clip delivery mechanism 213, upon which point, the magnetic clip stabilization mechanism 230 is automatically disengaged as the clip 202 is axially pushed through the clip delivery channel 212 (FIG. 14), where it is contracted through the conically converging portion 216 and delivered through the output 218 to the recipient channel 204 for engagement with the recess 208 (FIG. 15). The installation complete, the clip delivery mechanism 213 is retracted and the apparatus is ready for use in subsequent clip installations (FIG. 16), as applicable.

It will be appreciated by the skilled artisan that upon providing the clip stabilization mechanism 230, as described herein, it may become less relevant to also provide a retractable input cover 226, though such provision may still be considered as an option to further encourage proper alignment and orientation of the unbiased clip 202 at the recipient channel input 214. Similarly, the above embodiment contemplates an automatic clip feeding mechanism for repetitive operation and clip installation within a manufacturing chain, however, it will be appreciated that other implementations, for example operated for the installation of a single clip, or in other similar contexts, may also be considered within the scope of the present disclosure.

Referring now to FIGS. 17 and 17A, and in accordance with another embodiment of the invention, an apparatus, generally referred to using the numeral 300, for installing a ring-shaped clip as described above, will now be described. The apparatus 300 is similarly configured as that described above with respect to apparatus 200 depicted in FIGS. 10 to 16, however, in this embodiment, the clip stabilization mechanism 330 comprises one or more resiliently retractable structures, such as spring-loaded bearings 332, extending radially within the delivery channel 312 proximal the input 314 and shaped to mechanically circumferentially engage the clip 302 at the input 314 and resiliently retract upon axial displacement of the clip 302 against the retractable structures by the clip delivery mechanism 313. For example, in this embodiment, three circumferentially spaced-apart spring-loaded bearings 332 are disposed about the delivery channel input 314 such that upon feeding the clip 302 to the input 314, the clip 302 can rest on the deployed bearings 332, thus favouring an optimal coaxial alignment and orientation of the clip 302 with respect to the delivery channel 312. Upon deployment of the clip delivery mechanism 313, which applies an axial force on the clip 302, the stabilization mechanism is disengaged by way of the clip 302 being pushed past the spring-loaded bearings 332 that automatically retract under the force applied to the clip 302. The clip delivery mechanism 313 is then able to pursue its course in positioning and engaging the clip 302 with the recess 308, substantially as described above.

Referring now to FIGS. 18 and 18A, and in accordance with another embodiment of the invention, an apparatus, generally referred to using the numeral 400, for installing a ring-shaped clip as described above, will now be described. The apparatus 400 is similarly configured as that described above with respect to apparatus 200 and 300, however, in this embodiment, the clip stabilization mechanism's 430 one or more resiliently retractable structures comprise circumferentially spaced-apart arms or plungers 432 extending radially within the delivery channel 412 proximal the input 414 and shaped to resiliently retract upon axial displacement of the clip 402 against the retractable structures by the clip delivery mechanism 413. As in the above example, three circumferentially spaced-apart spring-loaded plungers 432 are disposed about the delivery channel input 414 such that upon feeding the clip 402 to the input 414, the clip 402 can rest on the deployed plungers 432, thus again favouring an optimal coaxial alignment and orientation of the clip 402 with respect to the delivery channel 412. Upon deployment of the clip delivery mechanism 413, which applies an axial force on the clip 402, the stabilization mechanism 430 is disengaged by way of the clip 402 being pushed past the aptly shaped spring-loaded plungers 432 that automatically retract under the force applied to the clip 402. The clip delivery mechanism 413 is then able to pursue its course in positioning and engaging the clip 402 with the recess 408, substantially as described above.

It will be appreciated that other mechanically implemented clip stabilization mechanisms may be considered herein to provide a similar effect, without departing from the general scope and nature of the present disclosure. Namely other shapes and orientations of retractable arms/plungers may be considered, as can other mechanically implemented means for stabilizing orientation of an unbiased clip at the input while automatically disengaging upon deployment of the clip delivery mechanism.

As introduced above, the installation of c-clips is common for retaining wrist pins in piston and connecting rod bores, namely as the provision of c-clips allows for an axial constraint on movement of the wrist pins while maintaining their ability to rotate within the bore. While this provides one field of application for the provision and installation of ring-shaped clips, it will be appreciated by the person of ordinary skill in the art that other applications may readily apply, and that, without departing from the general scope and nature of the present disclosure. Furthermore, the above-described embodiments of the invention could also be readily applied to the installation of other types of ring-shaped clips, which may for example, have different shapes and/or sizes. For example, a D-shaped clip could be installed within a correspondingly shaped receiving channel, as could other shapes be readily conceived and applied by the skilled artisan without departing from the general scope and nature of the above disclosure. Namely, while the provision of a C-clip may limit axial displacement while allowing for free rotation of a subsequently installed shaft, collar or the like within a correspondingly shaped and sized receiving channel, the provision of other shaped clips within correspondingly shaped receiving channels may again limit axial displacement of subsequently installed and correspondingly shaped shafts or collars, even if such shapes may not equally allow for a free rotation thereof within the channel.

While the present disclosure describes various exemplary embodiments, the disclosure is not so limited. To the contrary, the disclosure is intended to cover various modifications and equivalent arrangements included within the spirit and scope of the appended claims. The scope of the following claims is to be accorded the broadest interpretation so as to encompass all such modifications and equivalent structures and functions.

The invention claimed is:
1. An apparatus for installing a resilient ring-shaped clip within a recipient channel by engagement with a corresponding recess formed therein, comprising:
  a clip delivery structure having a delivery channel formed therein for coaxial alignment with the recipient channel, said delivery channel comprising an input for receiving the clip in said delivery channel, a conically converging portion for radially biasing the clip upon axial displacement of the clip therethrough, and an output shaped and sized for delivery of the radially biased clip to the recipient channel;
  a clip delivery mechanism for axially displacing the clip through said delivery channel and recipient channel until engagement of the clip with the recess; and
  a clip stabilization mechanism for stabilizing the clip in said delivery channel in substantial coaxial alignment with said delivery channel, and disengaging the clip upon axial displacement of the clip by said clip delivery mechanism, said clip stabilization mechanism comprising one or more magnets secured to said clip delivery structure.

2. The apparatus of claim 1, wherein said one or more magnets are circumferentially disposed about said delivery channel for magnetically radially engaging the clip.

3. The apparatus of claim 1, wherein said one or more magnets comprises two or more circumferentially spaced-apart magnets.

4. The apparatus of claim 2, wherein said two or more circumferentially spaced-apart magnets comprises at least three circumferentially spaced-apart magnets.

5. An apparatus for installing a resilient ring-shaped clip within a recipient channel by engagement with a corresponding recess formed therein, comprising:
- a clip delivery structure having a delivery channel formed therein for coaxial alignment with the recipient channel, said delivery channel comprising an input for receiving the clip in said delivery channel, a conically converging portion for radially biasing the clip upon axial displacement of the clip therethrough, and an output shaped and sized for delivery of the radially biased clip to the recipient channel;
- a clip delivery mechanism for axially displacing the clip through said delivery channel and recipient channel until engagement of the clip with the recess; and
- a clip stabilization mechanism for stabilizing the clip in said delivery channel in substantial coaxial alignment with said delivery channel, and disengaging the clip upon axial displacement of the clip by said clip delivery mechanism, said clip stabilization mechanism comprising one or more resiliently retractable structures that extend radially within said delivery channel proximal said input and are shaped to resiliently retract upon axial displacement of the clip against said retractable structures by said clip delivery mechanism.

6. The apparatus of claim 5, wherein said one or more retractable structures comprises one or more spring-loaded bearings or one or more spring-loaded arms.

7. The apparatus of claim 1, further comprising a clip feeding mechanism for feeding successive clips to said input for delivery to successive recipient channels in a manufacturing chain.

8. The apparatus of claim 1, further comprising a retractable input cover defining an input slot for guiding receipt of said clip at said input, said retractable input cover being retracted prior to activation of said clip delivery mechanism.

9. The apparatus of claim 1, wherein said recipient channel comprises a piston pin bore.

10. The apparatus of claim 1, wherein the recipient channel is defined within a recipient structure, and said clip delivery structure comprises a jig shaped and sized for cooperative alignment with the recipient structure in coaxially aligning said delivery channel with the recipient channel.

11. The apparatus of claim 1, wherein said input is shaped and sized for receiving the clip unbiased and substantially coaxially aligned with said delivery channel.

12. The apparatus of claim 1, wherein said clip stabilization mechanism is circumferentially disposed about said delivery channel at said input.

13. The apparatus of claim 1, wherein said clip stabilization mechanism is adapted to automatically disengage the clip upon axial displacement thereof by said clip delivery mechanism.

14. An apparatus for delivering a resilient ring-shaped clip to a recipient channel for engagement with a corresponding recess formed therein, the apparatus comprising:
- a delivery structure having a delivery channel formed therein for coaxial alignment with the recipient channel, and comprising an input for receiving the clip, a conically converging portion for radially biasing the clip upon axial displacement of the clip therethrough, and an output shaped and sized for delivery of the radially biased clip to the recipient channel; and
- a clip stabilization mechanism for stabilizing the clip in substantial coaxial alignment with the delivery channel, and disengaging the clip upon application of an axial force to the clip resulting in an axial displacement thereof through said delivery channel, said clip stabilization mechanism comprising one or more magnets secured to said clip delivery structure.

15. The apparatus of claim 14, wherein said one or more magnets are circumferentially disposed about said delivery channel for magnetically radially engaging the clip.

16. The apparatus of claim 14, wherein said one or more magnets comprise two or more circumferentially spaced-apart magnets.

17. An apparatus for delivering a resilient ring-shaped clip to a recipient channel for engagement with a corresponding recess formed therein, the apparatus comprising:
- a delivery structure having a delivery channel formed therein for coaxial alignment with the recipient channel, and comprising an input for receiving the clip, a conically converging portion for radially biasing the clip upon axial displacement of the clip therethrough, and an output shaped and sized for delivery of the radially biased clip to the recipient channel; and
- a clip stabilization mechanism for stabilizing the clip in substantial coaxial alignment with the delivery channel, and disengaging the clip upon application of an axial force to the clip resulting in an axial displacement thereof through said delivery channel, said clip stabilization mechanism comprising one or more resiliently retractable structures that extend radially within said delivery channel proximal said input and are shaped to resiliently retract upon axial displacement of the clip against said retractable structures by application of said axial force.

18. The apparatus of claim 17, wherein said one or more retractable structures comprise one or more spring-loaded bearings or one or more spring-loaded arms.

19. The apparatus of claim 14, wherein the recipient channel is defined within a recipient structure, and said clip delivery structure comprises a jig shaped and sized for cooperative alignment with the recipient structure in coaxially aligning said delivery channel with the recipient channel.

20. The apparatus of claim 14, wherein said input is shaped and sized for receiving the clip unbiased and substantially coaxially aligned with said delivery channel.

21. A method for installing a resilient ring-shaped clip within a recipient channel by engagement with a corresponding recess formed therein, comprising:
- coaxially aligning a clip delivery channel with the recipient channel, said clip delivery channel conically converging to a shape and size corresponding with that of the recipient channel;
- positioning the clip in said delivery channel;
- releasably stabilizing the clip in substantial coaxial alignment with said delivery channel by magnetically engaging said clip; and
- applying an axial force to the releasably stabilized clip to axially displace the clip through said conically converging delivery channel, thereby radially biasing the clip and delivering the radially biased clip through the recipient channel until engagement thereof with the recess.

22. The method of claim 21, further comprising feeding successive clips for positioning in said delivery channel, for delivery to successive recipient channels.

23. The method of claim 21, wherein said positioning step comprises positioning the clip unbiased in said delivery channel.

24. An apparatus for installing a resilient ring-shaped clip within a recipient channel by engagement with a corresponding recess formed therein, comprising:
   a clip delivery structure having a delivery channel formed therein for coaxial alignment with the recipient channel, said delivery channel comprising an input for receiving the clip in said delivery channel, a conically converging portion for radially biasing the clip upon axial displacement of the clip therethrough, and an output shaped and sized for delivery of the radially biased clip to the recipient channel;
   a clip delivery mechanism for axially displacing the clip through said delivery channel and recipient channel until engagement of the clip with the recess;
   a clip stabilization mechanism for stabilizing the clip in said delivery channel in substantial coaxial alignment with said delivery channel, and disengaging the clip upon axial displacement of the clip by said clip delivery mechanism; and
   a retractable input cover defining an input slot for guiding receipt of said clip at said input, said retractable input cover designed for retraction prior to activation of said clip delivery mechanism.

* * * * *